April 29, 1924.

H. DE ESCOBALES

PAPER RECEPTACLE MACHINE

Filed Nov. 8, 1919

INVENTOR
Hilarion de Escobales
BY
Meyers, Cushman & Rea
ATTORNEYS

April 29, 1924.

H. DE ESCOBALES

PAPER RECEPTACLE MACHINE

Filed Nov. 8, 1919     4 Sheets-Sheet 2

INVENTOR

Hilarion de Escobales

BY

Meyers, Cushman & Rea

ATTORNEYS

April 29, 1924.

H. DE ESCOBALES

PAPER RECEPTACLE MACHINE

Filed Nov. 8, 1919

Patented Apr. 29, 1924.

1,492,510

UNITED STATES PATENT OFFICE.

HILARION DE ESCOBALES, OF NEW YORK, N. Y.

PAPER-RECEPTACLE MACHINE.

Application filed November 8, 1919. Serial No. 336,716.

*To all whom it may concern:*

Be it known that I, HILARION DE ESCOBALES, a citizen of the United States, and a resident of New York city, in the county of Kings and State of New York, have invented certain new and useful Improvements in Paper-Receptacle Machines, of which the following is a specification.

My invention relates to machines for molding sheet material, and particularly to a machine for manufacturing dished articles, such as plates, saucers, cups, and the like, from flat blanks.

My invention, while applicable to the manufacture of a considerable variety of articles having a dished or concave top, is especially adapted to the production of plates or saucers made of light cardboard or the like. Hitherto, the manufacture of these articles has involved a very large amount of hand labor. Two machines have customarily been used, namely, a cutting machine for cutting out the blanks, and a press in which a relatively small number of blanks is molded to the desired shape, the feeding of the cutting machine and the press and the intermediate handling of the material being almost entirely manual.

An object of my invention is to provide a machine which is adapted to receive a continuous succession of properly shaped blanks and to deliver them molded or formed to the proper shape, the continuous operation of the machine permitting relatively high capacity of production.

I have also provided a machine of this type in which the blanks may be subjected simultaneously to heat and pressure for a considerable length of time, permitting the article to set in the desired shape without delaying the feeding of successive blanks to the machine.

A further object of my invention is to combine with a molding machine means for receiving successive sections of sheet material, cutting therefrom blanks of the desired form, and feeding the blanks in succession to the molding machine. I also provide means for automatically registering the fed blank in a mold and for automatically ejecting the formed article and removing it from the machine.

I have also provided means for printing each blank with any desired device during the feed of the blank to the molding machine. Plates and saucers are often intended to hold ice cream or other liquid or semi-liquid substances, and when designed for this purpose are generally made of relatively waterproof material, such as paraffin-coated or impregnated pasteboard. Material of this kind is relatively stiff and presents certain difficulties in handling.

My machine is adapted to employ such material; but it is also adapted to utilize relatively coarse and porous cardboard which is much cheaper and is readily molded. To render receptacles made of such material capable of holding liquids for a substantial length of time, I provide for the surfacing of the cardboard with relatively waterproof material, applied during the feeding of the cardboard, said material preferably being presented in sheet form. Glacine paper or similar moisture-resistant paper is suitable for this purpose, and I have disclosed a machine which may either feed a single web of waterproof cardboard to the mold or, at the user's option, may feed a web of cardboard and a web of surfacing material simultaneously, said webs being attached to each other during the process of producing a composite receptacle.

I also provide a construction by which the paper and cardboard may be continuously simultaneously fed, and means for attaching the paper to the cardboard during said feed. In the preferred form, I have disclosed a machine for feeding continuous webs of surfacing paper and cardboard, applying adhesive to the cardboard in suitable locations, attaching the paper to the cardboard, and feeding the combined web to the cutting means so that the surfacing paper and cardboard will be attached to each other in every blank.

I also disclose a machine in which the printing mechanism may be located so as to print a device upon the portion of the cardboard which will subsequently be the bottom of the plate or receptacle, prior to the application thereto of the waterproof paper. With this type of construction, the paper is preferably transparent, glassine paper being suitable for this purpose.

Other objects and advantages of my construction will be apparent from the following description taken in connection with the accompanying drawings, in which—

In the form of my invention disclosed in the accompanying drawings, a continuous web of suitable material in the form of a roll is mounted on the machine, and is fed continuously to the blank cutting mechanism. This material may consist of pasteboard, paper board, or any other suitable substance, the nature of which is determined solely by the article produced, and the nature of the forming operation, the only requirement being that it shall be capable of being formed between two dies to the desired shape. This material, which for convenience will be referred to as cardboard, may be fed through printing mechanism, which imprints a device at fixed intervals on the continuous web. The latter then passes through gluing mechanism, which applies glue to the surface, preferably on spaced portions adjacent the printing. A web of surfacing material, such as glassine paper, preferably carried in roll form on the frame of the machine, is fed into contact with the pasteboard web, and adheres thereto adjacent the printing, the combined web traveling to a reciprocating cutter which cuts out blanks of cardboard surfaced with paper and drops them into succeeding open dies peripherally arranged on a rotating turret. Upon clearing the cutting mechanism, the dies close on the blanks and form them into the desired shape, preferably with the application of sufficient heat to set the blank, the rotation of the turret permitting a substantial period to lapse between the closing of the dies and their subsequent opening when they again approach the cutting mechanism, means being provided at this point for ejecting the formed article.

In the specific embodiment of my invention illustrated in the drawings, I provide a base 10 upon which is mounted frame 11, carrying roll 12 of cardboard and roll 13 of surfacing paper, both mounted to revolve in the frame 11. The web 14 of cardboard passes over suitable guide means, such as guide rollers 15 and 16, and through suitable printing means adapted to imprint a fixed device at spaced intervals equal to the distance between centers of successive blanks cut from the web. Any desired printing means may be employed, the form disclosed including a rotating printing cylinder 17 tangent to the web, which is preferably pressed against the cylinder, as by roller 18 carried by fork 19 pivoted on the frame of the machine and connected to a rearwardly extending arm 20 carrying a sliding weight 21 adjustable thereon to vary the pressure of roller 18 against the paper. Suitable inking means is provided adjacent cylinder 17, a common type being disclosed, including an ink pot 22, wallower 23, transfer roller 24, and an ink applying roller 25, which preferably is adjustable to regulate the pressure thereof on cylinder 17. It will be apparent that the printing apparatus may be rendered inoperative either by retracting roller 25 completely from contact with cylinder 17, or by removing the entire inking apparatus from its bed plate, to which it is preferably detachably connected.

If the surfacing paper 13 is to be used, web 14 is next passed through a gluing device which applies glue to the printed surface thereof, either throughout its entire area, or preferably on spaced areas adjacent the printing, so as to hold the surfacing paper on the bottom of the receptacle.

I may provide means for applying glue to spaced portions of the web. While any desired form of glue applying mechanism may be employed, the latter preferably is of the stencil type, adapted to apply glue upon spaced areas of what will be the bottom of the receptacle. Said gluing means should also be readily adjustable to accommodate webs varying in width and to avoid printed matter differing in arrangement; and furthermore should be capable of being readily rendered completely inoperative in case the surfacing sheet is not employed. Various forms of glue applying mechanism for this purpose and operating in this manner are well-known, the specific type disclosed being illustrative only. I have shown a glue pot 26 detachably mounted on the frame and having a constantly revolving roller 27. Shaft 28 is revolved by suitable connections, as by gearing, with roller 27, and carries a plurality of segmental stencils 29, which preferably are loosely mounted upon shaft 28 and held in adjusted position thereon as by set screws, thus permitting adjustment of said segments to locate the glued areas in any desired position on the bottom of the receptacle, said construction further facilitating the replacement of said stencils by others varying in size. It will be apparent that a continuous roller may apply adhesive to the entire face of the cardboard web, if desired.

Web 14, traveling from the printing mechanism to the gluing mechanism, passes upwardly around roller 30. Means may be provided for holding the upward run of the web above roller 30 in contact with the gluing element, as by tie rod 31, which acts as a brace for the web above said elements, and tie rod 32 located behind the web below said elements.

Means may also be provided for adjusting the pressure of the upward run of the web against the glue applying elements. For this purpose, I may provide one of the tie rods, such as tie rod 32, with an eccentric central portion bearing against the web, said rod being adjustably rotatable in the frame and adapted to be held in adjusted position, as by the usual nuts threaded on the end thereof, the position of the eccentric determining the pressure of the web against the glue applying elements.

After passing the gluing mechanism, the web travels between a pair of feed rollers 33 and 34, and preferably between a second pair of similar feed rollers 35 and 36, the surfacing paper 13 being fed directly from its roll support between the feed rollers, at the same time maintaining registry with the cardboard web, the pressure of the rollers serving to force the paper into close contact with the cardboard and cause it to adhere thereto. Upper rollers 34 and 36 are preferably mounted in vertical sliding bearings 37 and are resiliently pressed downwardly into contact with lower rollers 33 and 35 as by springs 38.

Means is provided for rotating the feed rollers intermittently to feed the web a section at a time to the cutting mechanism. Any desired form of intermittently operating driving means may be employed. I have disclosed a mutilated gear 39 engaging a pinion 40 on a shaft 41 which carries a pinion 42 meshing with pinions 43 (Fig. 2) on the lower rollers 33 and 35. The upper feed rollers 34 and 36 may be positively driven from the lower feed rollers if desired, as by pinions 44.

The conveying mechanism and ink applying mechanism are preferably positively driven, any desired means being used. a gear train connected to one pinion 43 being disclosed.

While I have described printing mechanism and glue applying mechanism, it will be apparent that either or both may be dispensed with, the printing being optional with the user, and the use of the gluing mechanism being dependent upon the nature of the product desired, being used only when a surfacing sheet is to be glued to the cardboard face.

By providing means for rendering either of these mechanisms inoperative, it will be apparent that a considerable variety of products may be manufactured without substantially altering the machine. Furthermore, when both the printing and the surfacing sheet are eliminated, the cardboard may be fed directly to feed rollers 33 and 34.

Ordinarily, the surfacing material will not be used when the gluing mechanism is inoperative; but it is within the scope of my invention to utilize surfacing material which may be caused to adhere to the cardboard solely by the pressure of molding hereafter set forth, as by employing materials which will adhere by pressure or heat, or both, this quality being especially inherent in wax impregnated material.

Figures 4, 5, 6:
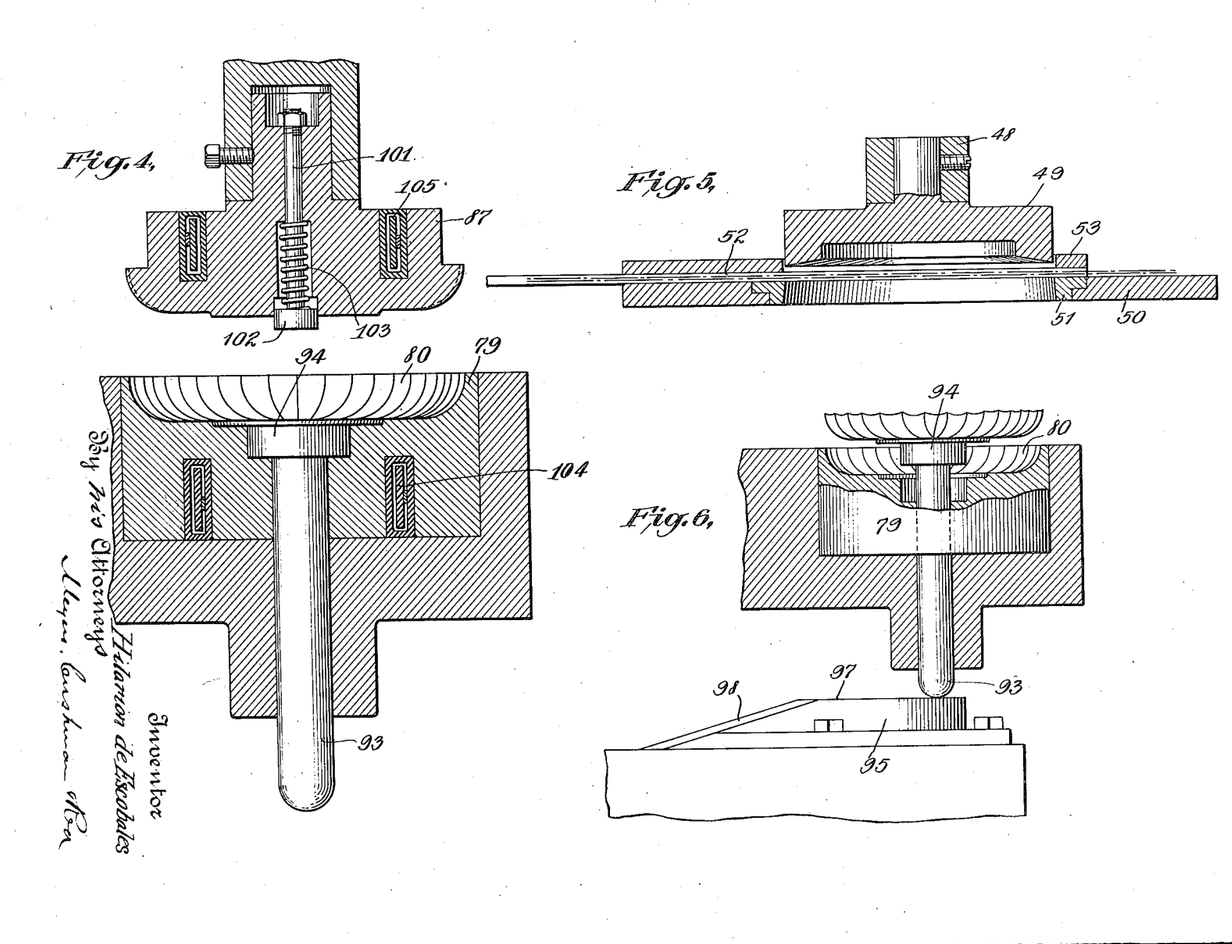
Fig. 4 is a detail vertical sectional view through one of the dies.
Fig. 5 is a vertical section through the blank cutter.
Fig. 6 is a detail view of the lower die, showing the receptacle ejecting mechanism.

The prepared web passes from the feed rollers to the blank cutting mechanism, various forms of which may be employed. In the preferred form, I have disclosed a frame 45 mounted on bed plate 46 of the molding mechanism. Reciprocating cutter mechanism is mounted on frame 45 and may include vertically reciprocating shaft 47 carried in bearings in said frame, having a cutter arm 48 mounted on said shaft, cutter 49 being preferably connected detachably to the end of said arm 48. Frame 45 may also carry means for guiding the web beneath cutter 49. Said guiding means preferably consists of a table 50 provided with a central recess in which is seated lower cutter member 51, as shown best in Fig. 5, said member being preferably removable and replaceable. Guide members 52 may be mounted on said table for directing the web accurately beneath cutter 49, and a stripper plate 53 is preferably located directly above the web adjacent cutter 49 to prevent the cutter, when rising, from carrying said web upward and away from table 50. Stripper plate 53, if desired, may lie across and be mounted on said guide members 52. Whatever type of cutting means is employed, it is desirable that a blank cut from the web shall drop downward therefrom into the die mechanism to be described.

Figure 1:
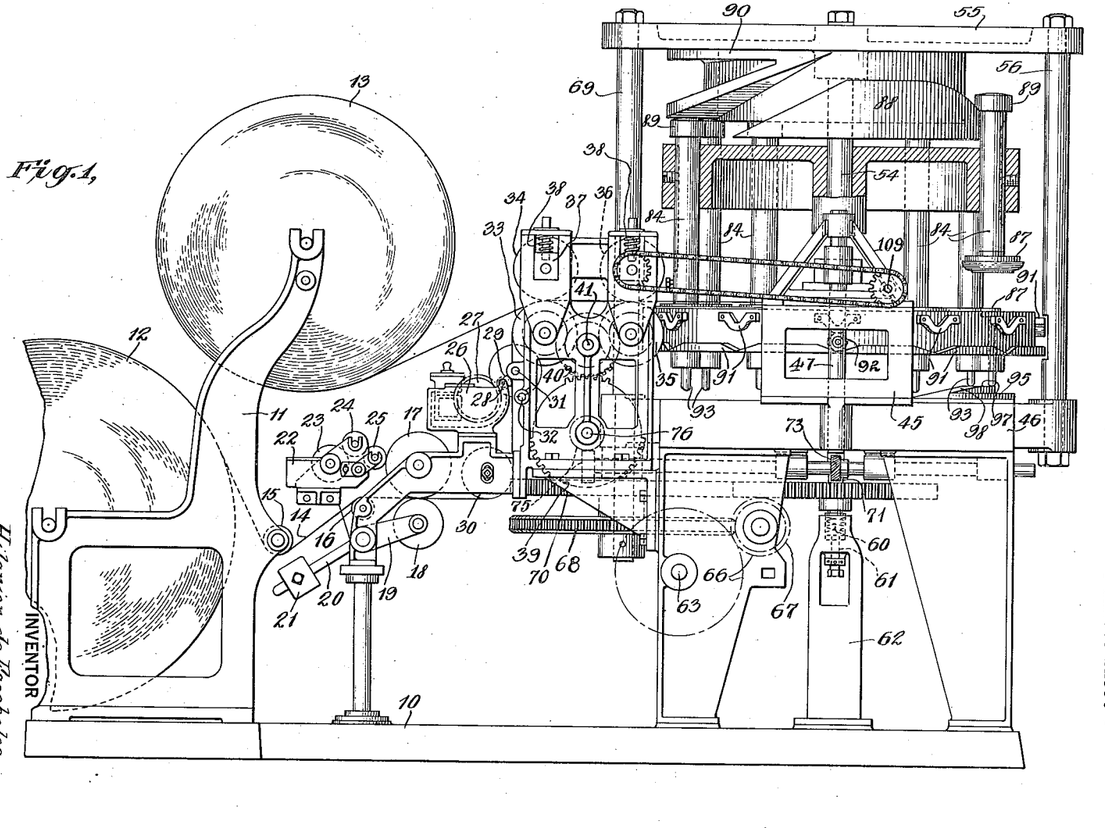
Fig. 1 is a side elevation of the entire machine.

For forming the blanks into the desired shape, I have provided a rotating turret mounted on a vertical central shaft 54 pivoted at its upper end in top plate 55 mounted on the bed 46 of the machine, as by pillars 56. The lower end of the shaft is supported in any desired way on the frame of the machine. Owing to the substantial weight of the parts mounted on shaft 54, I have provided two points of support to distribute the weight evenly and to avoid undue strain. For this purpose, a shoulder 57 may be provided on said shaft adjacent bed 46, resting in a bearing of any desired type, such as a friction washer 58 in oil cup 59. The lower end of shaft 54, as shown best in Fig. 1, may rest on a plurality of steel washers 60, which may be oval in cross section to support the weight of the turret and offer a minimum of resistance to rotation. A vertically adjustable support for the washers may be provided, such as screw 61 carried by pillar 62, the adjustment of the screw regulating the distribution of the turret weight between the bearing in bed plate 46 and the bearing carried by pillar 62. Obviously, many other forms of support for the turret may be substituted for the specific type disclosed; and my invention is not necessarily restricted even to the support of the turret upon a central shaft, as many other methods of supporting a rotating turret are well known.

Any desired means for rotating the turret, preferably at a fixed rate, may be provided. I have disclosed a drive shaft 63 (Fig. 2) connected, as by pulley 64, which may be of the fast and loose type, to a suitable source of power. Countershaft 65, driven from shaft 63 as by gears 66, is provided with a worm 67 driving a worm gear 68 carried by vertical shaft 69, journaled in the frame of the machine. Shaft 69 also carries pinion 70 meshing with pinion 71 on shaft 54, whereby the latter is constantly rotated.

Means for operating the feeding mechanism is preferably provided by connections with the rotating turret. I have disclosed connections driven from shaft 54, including a spiral gear 72 (Fig. 2) mounted on said shaft above pinion 71, and meshing with spiral gear 73 on countershaft 74, which carries a spiral gear meshing with spiral gear 75 mounted on shaft 76, located beneath the feed rollers. The opposite end of shaft 76, as shown best in Fig. 1, carries a mutilated gear 39 adapted to operate the feed rollers intermittently as hereinbefore described, said intermittent motion being preferably transmitted, as indicated, to the printing and gluing mechanism.

It will be evident that by suitably dimensioning the gears employed and by providing a plurality of spaced gear segments on mutilated gear 39, a single complete revolution of the turret and shaft 54 will produce any desired number of feeding movements of the feed rollers in accordance with the number of dies carried by said turret. Furthermore, the amount of web fed may be varied according to the size of the receptacle to be produced by replacing gear 39 with a similar gear having toothed segments of the desired length thereon.

The turret preferably includes a mold plate 77 mounted on shaft 54 and carrying a plurality of mold or lower die members concentrically arranged about its outer edge and so positioned that, when the turret is rotated, said members will come successively beneath cutter 49. Any desired form of mold may be employed, either integral with said plate 77 or, in the preferred form, mounted in sockets 78 therein, this construction permitting the ready changing of the lower molds. For purposes of illustration, I have disclosed circular sockets 78 and circular molds 79 adapted to seat therein and provided with suitably contoured molding recesses 80 in their upper faces. The rotation of the turret and the operation of the cutter mechanism are so timed that each blank, when cut, will fall accurately upon the top of a mold 79.

I preferably provide means for guiding said blank into accurate position over the mold, as by mounting a plurality of guide lugs 81 on mold plate 77, adjacent each socket 28, the inner faces of the lugs being inclined toward the upper edge of the socket so that a blank, when cut, will slide down the inner faces of said guide lugs 81 into accurate position over the mold. If desired, each mold may be held in position in its socket 78, as by a set screw 82.

I also provide a plurality of upper die members mounted in register with sockets 78 and adapted to reciprocate vertically into and out of engagement with molds seated in said sockets. One means of supporting said reciprocating upper die members is disclosed, including a plunger plate 83 connected to and rotating with plate 77, as by mounting said plunger plate on shaft 54. A plurality of die carrying members are movably mounted on plunger plate 83, as by providing vertical bearings in said plate registering with sockets 78, with vertical plungers 84 mounted slidably in said bearings, preferably being keyed therein to prevent rotation, as by screw stud 85 engaging a keyway 86 in each plunger 84. As shown best in Fig. 4, an upper die member 87 is mounted on the lower end of each plunger 84, and preferably is detachable therefrom to permit substitution of various forms of dies.

Means is provided for suitably reciprocating plungers 84, so that each upper die 87 will descend and force a blank into engagement with its mold 79 as soon as said die and mold have cleared the cutting mechanism, and will remain in blank pressing position until the die and mold approach the cutting mechanism, when said reciprocating means will raise the plunger, freeing the blank and permitting the upper die member to pass over the cutting mechanism.

One means for reciprocating plungers 84 in this manner while maintaining a proper synchronous relation with the cutting mechanism includes a plunger elevating cam 88, preferably mounted on top plate 55 and engaging the under side of an extension on the upper end of each plunger 84, which extension may be formed by mounting a suitably contoured head 89 at the upper end of each plunger. In the form disclosed, the plungers may descend by gravity when released by cam 88; but it will be apparent that my invention is not limited to this means of depressing the plungers.

A pressing cam 90 may also be mounted on top plate 55 adapted to engage the top of each plunger head 89 and force the plunger downward to press each blank forcibly into engagement with its mold 79.

Any desired means for reciprocating shaft 47 and operating the cutting mechanism may be employed. In the specific form disclosed, I have provided a plurality of suitable cam elements 91, shown best in Fig. 1, adapted to engage the cam roller 92 mounted on shaft 47 and to depress said shaft and the cutter 49 when a mold is in proper position beneath the cutter. It will be understood, however, that this specific actuating means may be greatly varied, and that the cutter may be driven by connections with drive shaft 63 which will not include shaft 54, thus freeing the turret from any possibility of displacement by the cutter actuating mechanism.

I preferably provide means for ejecting the formed receptacle from each mold just prior to the entry of the mold beneath the cutter. For this purpose, I may employ an ejector rod 93 vertically slidable in and projecting through the bottom of each mold socket 78, and carried in vertical bearings in each mold 79, preferably centrally located therein and having an enlarged head portion 94 seated in and flush with the bottom of the mold cavity 80, as shown best in Fig. 4.

Means is provided for elevating said plunger to eject the molded receptacle at a suitable time. For this purpose, I may employ a vertical cam plate 95 mounted on bed 46 and provided with an initial upwardly inclined cam face 96 up which plunger rod 93 rides when approaching the cutting mechanism, an intermediate portion 97 for holding the ejector rod 93 in elevated position, shown in Fig. 6, while the receptacle is removed, and a descending cam face 98 permitting said ejector to recede into its normal seated position prior to the descent of the upper die 87.

Figure 2:
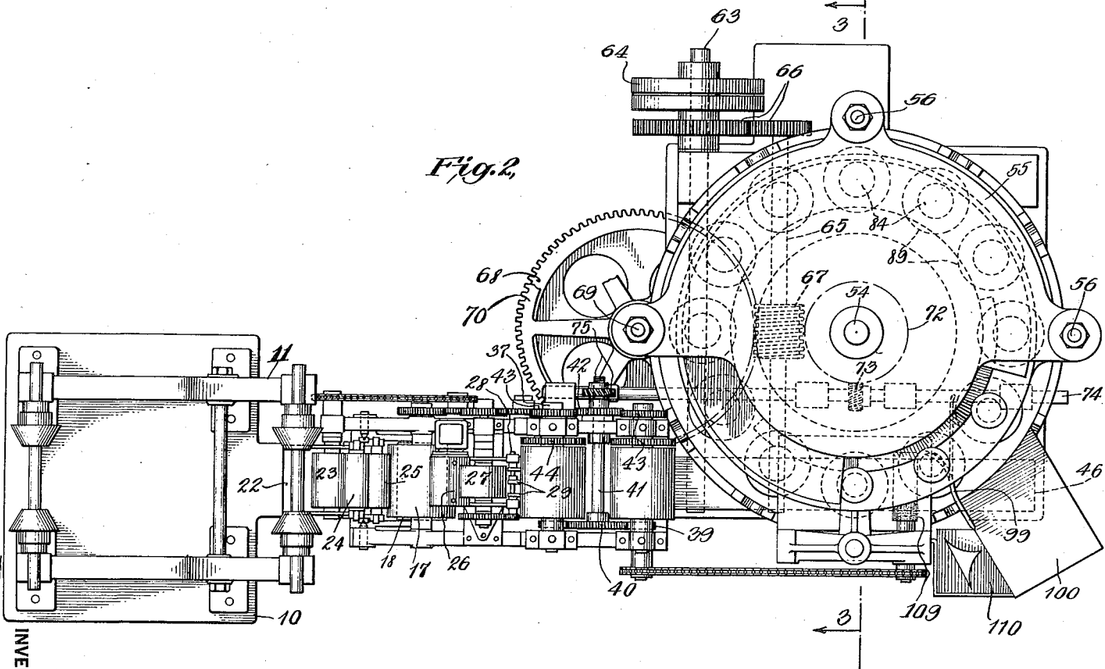
Fig. 2 is a top plan view of the construction shown in Fig. 1.
Figure 3:
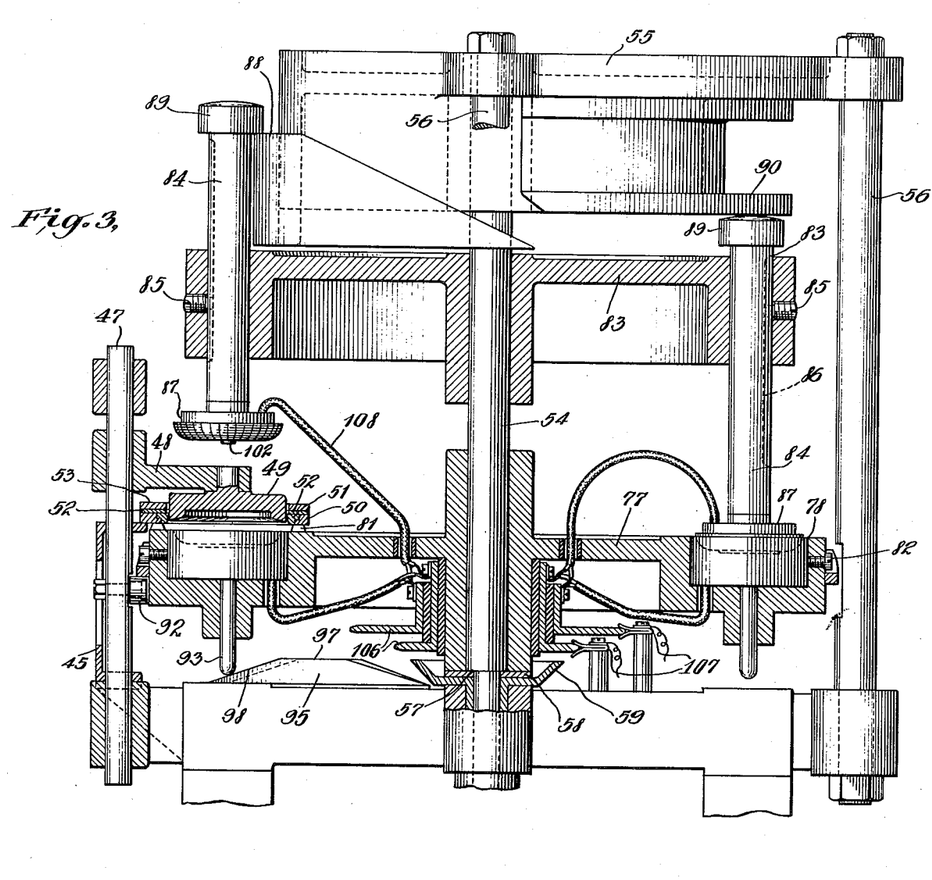
Fig. 3 is a transverse sectional view on line 3—3 of Fig. 2, the upper portion being shown in perspective.

Any suitable means for removing the receptacle from the elevated ejector may be utilized, such as a discharge arm 99, shown best in Fig. 2, mounted on the frame of the machine and extending in fixed position across and just above the path of the dies, and adapted to scrape the successive elevated receptacles off of the ejector head 94 and the surface of mold plate 77 into any suitable receiving means, such as a discharge chute 100. It will be apparent that many other arrangements for this purpose may be used, and that, if desired, the receptacles may be removed by hand.

I also may employ means for separating the upper die 87 from the receptacle when said die is elevated. For this purpose, I may employ a disengaging plunger 101, slidably mounted in said die and having a head 102 normally projected beyond the bottom of said die, as by spring 103, and adapted to be forced into position flush with the bottom of the die when in engagement with the receptacle and mold, said spring 103 forcing head 102 outward and clearing the die from the receptacle as the die starts to rise.

While certain materials may be molded by pressure alone, I provide means for heating either the upper die, the mold, or both, if desired. For heating the mold, I may either heat the entire outer part of mold plate 77 in any desired way, or I may heat each individual mold. For the latter purpose, I may employ an electric heating coil 104 of the usual type, preferably carried by said mold. When this form of construction is employed, the mold 79 and socket 78 may be so formed as to provide suitable spaces between the mold and socket, to prevent unnecessary radiation of heat. Means for heating the upper dies may be of any desired form, preferably including a separate heating unit for each die. If electrical heating means is utilized, a heating coil 105 of the usual type may be carried by each upper die 87. For connecting said coils 104 and 105 with a suitable source of electrical energy, I may employ a pair of collector rings 106 mounted below plate 77, insulated therefrom and from each other. Rings 106 are connected to opposite poles of a suitable source of electrical energy, as by providing a stationary sliding contact 107 for each ring, the contacts being suitably connected to said source. Each coil 104 and 105 has its terminals connected to rings 106, connecting wires 108 for coils 105 being of sufficient length to permit the vertical reciprocation of the upper dies 87 without exerting undue strain on said wires.

If desired, I may also include means for removing the scraps of material after the blanks have been cut therefrom by mounting a rotating brush 109 (Fig. 1) above and in contact with table 50, rotating said brush in any desired manner, as by chain and sprocket connection with one of the feed rollers, the brush serving to clear the scraps away from the table and prevent jamming, a suitable discharge chute 110 for said scraps being illustrated.

The operation of the machine has been fully indicated in connection with the detailed description of the parts. It will be apparent that I have provided a continuously operating machine, in which each receptacle is not merely formed, but is held in the mold under pressure for a substantial length of time, preferably with the application of heat, permitting the plate to set. This is especially valuable where the sheet material either includes a substance softened by heat, the continued pressure permitting the heat to have its full effect; or when the sheet material is in a relatively moist condition, rendering it more readily molded. In the latter case it is important that the receptacle be held in the mold long enough for the material to dry somewhat. In this connection, it will be evident that the sheet material may either be fed in moistened condition, or if desired, may be moistened during its treatment preparatory to cutting the blanks therefrom.

Owing to the number of molds employed, the receptacles may be produced at a relatively rapid rate, while retaining each receptacle in its mold for a substantial length of time, the speed of production being dependent solely upon the number of molds used, if a certain minimum period of molding be employed. The arrangement of the cutting mechanism cooperates with the reciprocating upper die members to produce this result, as the dies are idle only while passing the cutter.

Furthermore, it will be apparent that other methods of feeding the sheet material to the molding mechanism may be utilized; but the specific type disclosed cooperates with the molding mechanism to produce the continuous manufacture of a particular type of receptacle, and enables that type to be varied at will.

While I have disclosed cutting mechanism located directly above the path of the molds so that each blank, when cut, will drop directly upon a mold, it will be apparent that this arrangement of the cutting mechanism may be varied and any desired means of guiding the cut blank from said mechanism to the mold may be employed within the scope of my invention. In the form disclosed, the lower portion of the lower cutter member 51 acts as a feeding guide for the cut blank, directing it in its downward path to insure its registration with the passing mold.

Although the present specific disclosure relates to mechanism for producing plates, saucers and the like, there are numerous articles of similar shape well-known in the art and produced by pressure between opposing die elements. My invention is obviously adapted to the production of such articles, and the specific disclosure is in this respect purely illustrative.

While I have described a preferred form of my invention and certain modifications therein, it will be apparent that many other changes may be made without departing from my invention as set forth in this specification.

I claim:

1. In a receptacle molding machine, a moving support, a plurality of molds mounted on said support and adapted to pass in succession a charging station, each of said molds including a fixed portion and a movable portion, means located in relatively-fixed position at the charging station and in the normal path of said movable portion when the mold is closed, adapted to cut and feed blanks to the successive molds, and means for shifting said movable portion upon its approach to the charging station to open the mold and cause said movable portion to clear the feeding means, permitting the removal of a formed receptacle and the feeding of a blank to said mold.

2. In a receptacle molding machine, a movable support, a plurality of molds mounted on said support and adapted to pass a changing station in rotation, each mold comprising relatively fixed and movable parts, and means located at said charging station and free from moving connection with said movable support for cutting and feeding a blank of sheet material to the lower part of each of said molds while the mold parts are separated.

3. In a receptacle molding machine, a moving support, a plurality of molds mounted thereon and passing a fixed charging station in rotation, each mold comprising relatively fixed and movable parts, and means located at said charging station and above the molds for cutting blanks from sheet material, the construction being such that each blank, when cut, will fall by gravity upon the lower part of a mold passing beneath the cutting means while the mold parts are separated.

4. In a receptacle molding machine, a revolving support, a plurality of molds mounted thereon and passing a relatively stationary charging station in rotation, each mold comprising relatively fixed and movable parts, means located at said charging station and above the molds for cutting blanks from sheet material, the construction being such that each blank, when cut, will fall by gravity upon the lower part of a mold passing beneath the cutting means; and means while the mold parts are separated for guiding said blank into register with each mold.

5. In a receptacle molding machine, a continuous traveling support, a plurality of molds mounted thereon and passing a stationary charging station in rotation, each mold comprising relatively fixed and movable parts, means located at said charging station and above the molds for cutting blanks from sheet material, the construction being such that each blank, when cut, will fall by gravity upon the lower part of a mold passing beneath the cutting means; and means while the mold parts are separated, carried by said support, for guiding the blanks into register with the molds.

6. In a receptacle molding machine, a support rotating in a plane about a fixed axis, a plurality of molds mounted on said support, equidistant from the axis and passing a charging station in rotation, and means for opening each of said molds as it approaches the charging station and automatically closing each mold after passing the charging station, means for feeding a continuous web of fibrous sheet material between the separated mold parts, and means at a stationary point in relation to the moving mold support and located between the separated mold part for cutting a blank from said web and placing it in one of the mold parts for subsequent pressing and molding action of the mold members during their travel with the carrier to a discharge point.

7. In a receptacle molding machine, a support rotating in a plane about a fixed axis, a plurality of molds mounted on said support equidistant from the axis and adapted to pass a charging station in rotation, each mold including a fixed member and a movable member, means for shifting each movable member upon approaching the charging station to open each mold, and for automatically shifting said movable member upon passing the charging station to close the mold, means for feeding a continuous web of fibrous sheet material between the separated mold parts, and means at a stationary point in relation to the moving mold support and located between the separated mold parts for cutting a blank from said web and placing it in one of the mold parts for subsequent pressing and molding action of the mold members during their travel with the carrier to a discharge point.

8. In a receptacle molding machine, a support rotating in a plane about a fixed axis, a plurality of molds mounted on said support and passing a charging station in rotation, each mold including a fixed member and a movable member, a supporting element mounted on said rotating support and carrying said movable mold members, and means for shifting each of said movable members upon approaching the charging station to open each mold, and for automatically shifting said member after passing the station to close each mold, means for feeding a continuous web of fibrous sheet material between the separated mold parts, and means at a stationary point in relation to the moving mold support and located between the separated mold parts for cutting a blank from said web and placing it in one of the mold parts for subsequent pressing and molding action of the mold members during their travel with the carrier to a discharge point.

9. In a receptacle molding machine, a support rotating about a fixed axis, a plurality of molds mounted on said support and passing a charging station in rotation, each mold including a fixed member mounted on said support and a movable member, a supporting member, mounted in fixed position upon and rotating with said support, in which said movable mold members are slidably mounted, and means for shifting each of said movable mold members upon approaching the charging station to open the mold, and for automatically shifting said movable member upon passing the charging station to close the mold, means for feeding a continuous web of fibrous sheet material between the separated mold parts, and means at a stationary point in relation to the moving mold support and located between the separated mold parts for cutting a blank from said web and placing it in one of the mold parts for subsequent pressing and molding action of the mold members during their travel with the carrier to a discharge point.

10. In a receptacle molding machine, a rotating support, a plurality of lower mold members mounted on said support and passing a charging station in rotation, a plurality of upper mold members each registering with a lower mold member, a support for said upper mold members movable with the support for the lower mold members, and means mounted in fixed position adjacent the charging station for shifting the upper mold members to open the mold upon approaching said station, and for automatically shifting said members to close the mold upon passing the station, means for feeding a continuous web of fibrous sheet material between the separated mold parts, and means at a stationary point in relation to the moving mold support and located between the separated mold parts for cutting a blank from said web and placing it in one of the mold parts for subsequent pressing and molding action of the mold members during their travel with the carrier to a discharge point.

11. A receptacle molding machine comprising a rotary mold carrier, means for rotating the carrier, fixed mold elements in spaced relation on the carrier, cooperating movable mold elements arranged to rotate with the carrier, means for advancing the movable mold elements to cooperative relation with the fixed mold elements and retracting the movable elements substantially at a mold filling position, means for advancing a continuous web of sheet material between the cooperative mold elements as they are successively brought to the mold filling position, means for cutting a blank from the web and inserting it in each fixed mold element at the filling position, and means for producing a modification of successive portions of the continuous web at intervals corresponding to the individual blanks prior to the blank severing operation.

12. A receptacle molding machine comprising a rotary mold carrier, means for rotating the carrier, fixed mold elements in spaced relation on the carrier, co-operating movable mold elements arranged to rotate with the carrier, means for advancing the movable mold elements to cooperative relation with the fixed mold elements and retaining them in such position during a large part of the carrier travel and retracting the movable elements substantially at a mold-filling position, means for advancing a continuous web of sheet material between the cooperative mold elements as they are successively brought to the mold-filling position, means for cutting a blank from the web and inserting it in each fixed mold element at filling position, and means acting prior to the blank severing operation for producing a modification of successive portions of the continuous web at intervals corresponding to the individual blanks.

13. A receptacle molding machine comprising a rotary mold carrier, means for rotating the carrier, fixed mold elements in spaced relation on the carrier, cooperating movable mold elements arranged to rotate with the carrier, means for advancing the movable mold elements to cooperative relation with the fixed mold elements and retracting the movable elements substantially at a mold filling position, means for advancing a continuous web of sheet material between the cooperative mold elements as they are successively brought to the mold filling position, means for cutting a blank from the web and inserting it in each fixed mold element at filling position, and means for making an imprint on successive portions of the continuous web at intervals corresponding to the individual blanks prior to the blank severing operation.

14. A receptacle molding machine comprising a rotary mold carrier, means for rotating the carrier, fixed mold elements in spaced relation on the carrier, cooperating movable mold elements arranged to rotate with the carrier, means for advancing the movable mold elements to cooperative relation with the fixed mold elements and retracting the movable elements substantially at a mold filling position, means for advancing a continuous web of sheet material between the cooperative mold elements as they are successively brought to the mold filling position, means for cutting a blank from the web and inserting it in each fixed mold element at the filling position, means for producing a modification of successive portions of the continuous web at intervals corresponding to the individual blanks prior to the blank severing operation, and means for adjusting the feed of the web to properly register the modified portions thereof with the cutting means.

15. A receptacle molding machine comprising a rotary mold carrier, means for rotating the carrier, fixed mold elements in spaced relation on the carrier, cooperating movable mold elements arranged to rotate with the carrier, means for advancing the movable mold elements to cooperative relation with the fixed mold elements and retracting the movable elements substantially at a mold filling position, means for advancing a continuous web of sheet material between the cooperative mold elements as they are successively brought to the mold filling position, means for cutting a blank from the web and inserting it in each fixed mold element at filling position, means for making an imprint on successive portions of the continuous web at intervals corresponding to the individual blanks prior to the blank severing operation, and means for adjusting the feed of the web to properly register the modified portions thereof with the cutting means.

16. In a receptacle molding machine, means for feeding a plurality of strips of sheet material into superimposed relation, means for applying adhesive to one of said strips prior to said superimposition to connect said strips to each other at predetermined points, means for cutting successive blanks from the superimposed strips at said points, and means for molding said blanks.

17. In a receptacle molding machine, means for feeding a continuous web of sheet material, means for impressing indicia upon spaced portions thereof, means for applying adhesive to the web adjacent to said indicia, means for feeding a second web of sheet material into superimposed relation to said strip and attached thereto by said adhesive, means for cutting from the combined strip and web a plurality of blanks, each including said indicia, and means for molding said blanks.

18. In a receptacle molding machine, means for feeding a strip of sheet material, means for printing indicia thereon at fixed intervals, means for applying adhesive to said strip adjacent to said indicia, said adhesive applying means being adjustable to vary the location of said adhesive on the strip in conformity with the nature of the indicia, means for feeding a second web of sheet material into superimposed relation to said strip and attached thereto by said adhesive, means for cutting from the combined strip and web a plurality of blanks, each including said indicia, and means for molding said blanks.

19. Mechanism for forming substantially dish- or cup-shaped articles from continuous fibrous sheet material, comprising a rotary mold carrier, a spaced series of molds thereon, a series of dies each corresponding to one of the molds mounted for movement in the carrier in relation to the molds, means for retracting the dies at a point anterior to a charging station which is stationary in relation to the carrier, for maintaining them in a retracted position as they pass the charging station and for then advancing them to cooperative relation with the molds to form and press blanks therein, said dies being retained in pressing position during a substantial part of the carrier movement, blank cutting and mold charging means located between the molds and dies at the charging station, and means for advancing a continuous web of fibrous sheet material to a point between the molds and dies at the charging station.

Signed at New York city in the county of New York and State of New York this 3rd day of November, A. D. 1919.

HILARION DE ESCOBALES.